United States Patent
Schwarz et al.

(10) Patent No.: US 10,144,519 B2
(45) Date of Patent: Dec. 4, 2018

(54) COMPRESSOR BLEED AIR SUPPLY FOR AN AIRCRAFT ENVIRONMENTAL CONTROL SYSTEM

(71) Applicant: United Technologies Corporation, Hartford, CT (US)

(72) Inventors: Frederick M. Schwarz, Glastonbury, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 300 days.

(21) Appl. No.: 14/887,932

(22) Filed: Oct. 20, 2015

(65) Prior Publication Data

US 2016/0114894 A1   Apr. 28, 2016

Related U.S. Application Data

(60) Provisional application No. 62/068,292, filed on Oct. 24, 2014.

(51) Int. Cl.
*B64D 13/06* (2006.01)
*F02C 3/04* (2006.01)
(Continued)

(52) U.S. Cl.
CPC .............. *B64D 13/06* (2013.01); *F02C 3/04* (2013.01); *F02C 3/06* (2013.01); *F02C 3/107* (2013.01);
(Continued)

(58) Field of Classification Search
CPC ... B64D 13/06; B64D 2013/0618; F02C 3/04; F02C 3/06; F02C 3/107; F02C 6/08; F02C 7/12; F02C 7/18; F02C 7/185; F02C 7/36; F02C 9/18; F02K 3/00; F02K 3/04; F02K 3/06; F05D 2220/323; F05D 2240/24;
(Continued)

(56) References Cited

U.S. PATENT DOCUMENTS

| | | |
|---|---|---|
| 2,871,671 A | 2/1959 | Bartlett et al. |
| 4,285,466 A | 8/1981 | Linscheid et al. |

(Continued)

FOREIGN PATENT DOCUMENTS

WO   2014109786   7/2014

OTHER PUBLICATIONS

Extended European Search Report for Application No. 15190709.4 dated Mar. 18, 2016.

*Primary Examiner* — Scott Walthour
(74) *Attorney, Agent, or Firm* — Carlson, Gaskey & Olds, P.C.

(57) ABSTRACT

A gas turbine engine includes a fan, a compressor section having at least two sequential compressors, a combustor section fluidly connected to the compressor section, and a turbine section fluidly connected to the combustor section. The turbine section includes at least a first turbine, a second turbine and a third turbine. One of the first turbine, the second turbine and the third turbine is a fan-drive turbine. An environmental control system air supply includes at least a first compressor bleed and a second compressor bleed. Each of the first compressor bleed and the second compressor bleed are positioned upstream of a highest pressure compressor of the at least two compressors.

10 Claims, 2 Drawing Sheets

(51) Int. Cl.
  *F02K 3/04* (2006.01)
  *F02K 3/06* (2006.01)
  *F02C 7/18* (2006.01)
  *F02C 7/36* (2006.01)
  *F02K 3/00* (2006.01)
  *F02C 6/08* (2006.01)
  *F02C 3/06* (2006.01)
  *F02C 3/107* (2006.01)
  *F02C 7/12* (2006.01)
  *F02C 9/18* (2006.01)

(52) U.S. Cl.
  CPC ............ *F02C 6/08* (2013.01); *F02C 7/12* (2013.01); *F02C 7/18* (2013.01); *F02C 7/185* (2013.01); *F02C 7/36* (2013.01); *F02C 9/18* (2013.01); *F02K 3/00* (2013.01); *F02K 3/04* (2013.01); *F02K 3/06* (2013.01); *B64D 2013/0618* (2013.01); *F05D 2220/323* (2013.01); *F05D 2240/24* (2013.01); *F05D 2240/35* (2013.01); *F05D 2240/60* (2013.01); *F05D 2260/40* (2013.01); *F05D 2260/40311* (2013.01)

(58) Field of Classification Search
  CPC ............ F05D 2240/60; F05D 2260/40; F05D 2260/40311
  See application file for complete search history.

(56) References Cited

U.S. PATENT DOCUMENTS

| | | |
|---|---|---|
| 5,063,963 A | 11/1991 | Smith |
| 6,412,270 B1 | 7/2002 | Mortzheim et al. |
| 6,647,730 B2 | 11/2003 | Liu |
| 6,684,660 B1 | 2/2004 | Bruno et al. |
| 7,171,819 B2 | 2/2007 | Lui et al. |
| 7,305,842 B1 | 12/2007 | Schiff |
| 7,785,066 B2 | 8/2010 | Bil et al. |
| 8,276,392 B2 | 10/2012 | Van Der Woude |
| 2008/0050218 A1* | 2/2008 | Sokhey ............ F01D 17/105 415/119 |
| 2013/0098067 A1* | 4/2013 | Suciu ............ F02C 7/32 60/802 |
| 2013/0174573 A1 | 7/2013 | Hipsky et al. |
| 2014/0250860 A1* | 9/2014 | Sidelkovskiy ............ F02C 3/107 60/39.15 |
| 2014/0250898 A1 | 9/2014 | Mackin et al. |
| 2014/0250904 A1* | 9/2014 | Lebel ............ F02C 6/003 60/774 |
| 2015/0107261 A1* | 4/2015 | Moes ............ B64D 13/06 60/783 |
| 2015/0275769 A1* | 10/2015 | Foutch ............ F02C 9/18 60/776 |
| 2015/0354464 A1* | 12/2015 | Hillel ............ F02C 3/04 415/1 |

* cited by examiner

COMPRESSOR BLEED AIR SUPPLY FOR AN AIRCRAFT ENVIRONMENTAL CONTROL SYSTEM

CROSS-REFERENCE TO RELATED APPLICATION

This application claims priority to U.S. Provisional Application No. 62/068,292 filed Oct. 24, 2015.

TECHNICAL FIELD

The present disclosure relates generally to aircraft environmental control systems, and more specifically to a compressor bleed air supply for the same.

BACKGROUND

Aircraft, such as commercial airliners, typically include an environmental control system that provides the pressurization of a passenger cabin, as well as the supply of air to the passenger cabin during flight. The environmental control system utilizes air drawn from within the compressor section of at least one gas turbine engine on the aircraft to provide the necessary pressurization to the passenger cabin.

A typical gas turbine engine utilizes a compressor section, with multiple sequential compressors, to compress air and provides the compressed air to a combustor where the compressed air is mixed with fuel and ignited. The resultant gasses are expanded through a series of sequential turbines in a turbine section, with the expansion of the gasses driving the turbines to rotate.

Current engine designs include a high pressure bleed drawing air from the high pressure compressor and providing the air to the environmental control system. Also included in the typical designs is a second, low pressure bleed, connected to the lower pressure compressor and providing low pressure air to the environmental control system. Extracting air from the high pressure compressor carries a larger efficiency penalty than extracting air from the low pressure compressor.

SUMMARY OF THE INVENTION

In one exemplary embodiment a gas turbine engine includes a fan, a compressor section having at least two sequential compressors, a combustor section fluidly connected to the compressor section, and a turbine section fluidly connected to the combustor section. The turbine section includes at least a first turbine, a second turbine and a third turbine. One of the first turbine, the second turbine and the third turbine is a fan-drive turbine. An environmental control system air supply includes at least a first compressor bleed and a second compressor bleed. Each of the first compressor bleed and the second compressor bleed are positioned upstream of a highest pressure compressor of the at least two compressors.

In another exemplary embodiment of the above described gas turbine engine, the highest pressure compressor is characterized by a lack of environmental control system air supply bleeds.

In another exemplary embodiment of any of the above described gas turbine engines, the fan is a direct drive fan and is directly connected to one of the first turbine, the second turbine and the third turbine via a shaft.

In another exemplary embodiment of any of the above described gas turbine engines, the fan is a geared fan and is connected to a shaft corresponding to the fan-drive turbine.

In another exemplary embodiment of any of the above described gas turbine engines, a highest pressure compressor of the at least two sequential compressors is drivably connected to a highest pressure turbine. At least one remaining compressor is drivably connected to an intermediate pressure turbine of the at least the first turbine, the second turbine and the third turbine. The fan is drivably connected to a lowest pressure turbine of the at least the first turbine, the second turbine and the third turbine.

In another exemplary embodiment of any of the above described gas turbine engines, the compressor section includes at least three compressors, and wherein a highest pressure compressor of the at least three compressors is drivably connected to the highest pressure turbine, and a remainder of the at least three compressors are drivably connected to the intermediate pressure turbine.

In another exemplary embodiment of any of the above described gas turbine engines, the fan section includes a fan air source operable to provide fan air to an environmental control system pre-cooler.

In another exemplary embodiment of any of the above described gas turbine engines, the at least a first compressor bleed and a second compressor bleed includes a natural bleed disposed between a highest pressure compressor and a compressor upstream of the highest pressure compressor.

An exemplary method for providing engine air to an environmental control system includes providing low pressure air from a first compressor bleed upstream of a highest pressure compressor in a compressor section, and providing high pressure air from a second compressor bleed upstream of the highest pressure compressor in the compressor section.

In a further example of the above exemplary method, the first compressor bleed and the second compressor bleed bleed air from a single compressor in the compressor section.

In a further example of any of the above exemplary methods, providing low pressure air from a first compressor bleed upstream of a highest pressure compressor in a compressor section, and providing high pressure air from a second compressor bleed upstream of the highest pressure compressor in the compressor section includes providing low pressure air from a bleed location upstream of a high pressure bleed location.

A further example of any of the above exemplary methods includes providing fan air to a pre-cooler system of an environmental control system, wherein the pre-cooler system is operable to cool compressor bleed air provided to the environmental control system.

In one exemplary embodiment a gas turbine engine includes a fan, a compressor section having at least two sequential compressors, a combustor section fluidly connected to the compressor section, and a turbine section fluidly connected to the combustor section. The turbine section includes at least three turbine sections. An environmental control system air supply includes at least a first compressor bleed and a second compressor bleed. Each of the first compressor bleed and the second compressor bleed are upstream of a highest pressure compressor of the at least two sequential compressors.

In another exemplary embodiment of the above described gas turbine engine, the highest pressure compressor is characterized by a lack of environmental control system air supply bleeds.

In another exemplary embodiment of any of the above described gas turbine engine, a highest pressure compressor of the at least two sequential compressors is drivably connected to a highest pressure turbine, at least one remaining compressor is drivably connected to an intermediate pressure turbine of a first turbine, a second turbine and a third turbine, and wherein the fan is drivably connected to a lowest pressure turbine of the first turbine, second turbine and third turbine.

In another exemplary embodiment of any of the above described gas turbine engine, the compressor section includes at least three compressors, and wherein a highest pressure compressor of the at least three compressors is drivably connected to the highest pressure turbine, and a remainder of the at least three compressors are drivably connected to the intermediate pressure turbine.

In another exemplary embodiment of any of the above described gas turbine engine, the fan section includes a fan air source operable to provide fan air to an environmental control system pre-cooler.

In another exemplary embodiment of any of the above described gas turbine engine, the at least a first compressor bleed and a second compressor bleed comprises a natural bleed disposed between a highest pressure compressor and a compressor upstream of the highest pressure compressor.

These and other features of the present invention can be best understood from the following specification and drawings, the following of which is a brief description.

DETAILED DESCRIPTION OF AN EMBODIMENT

Figure 1:
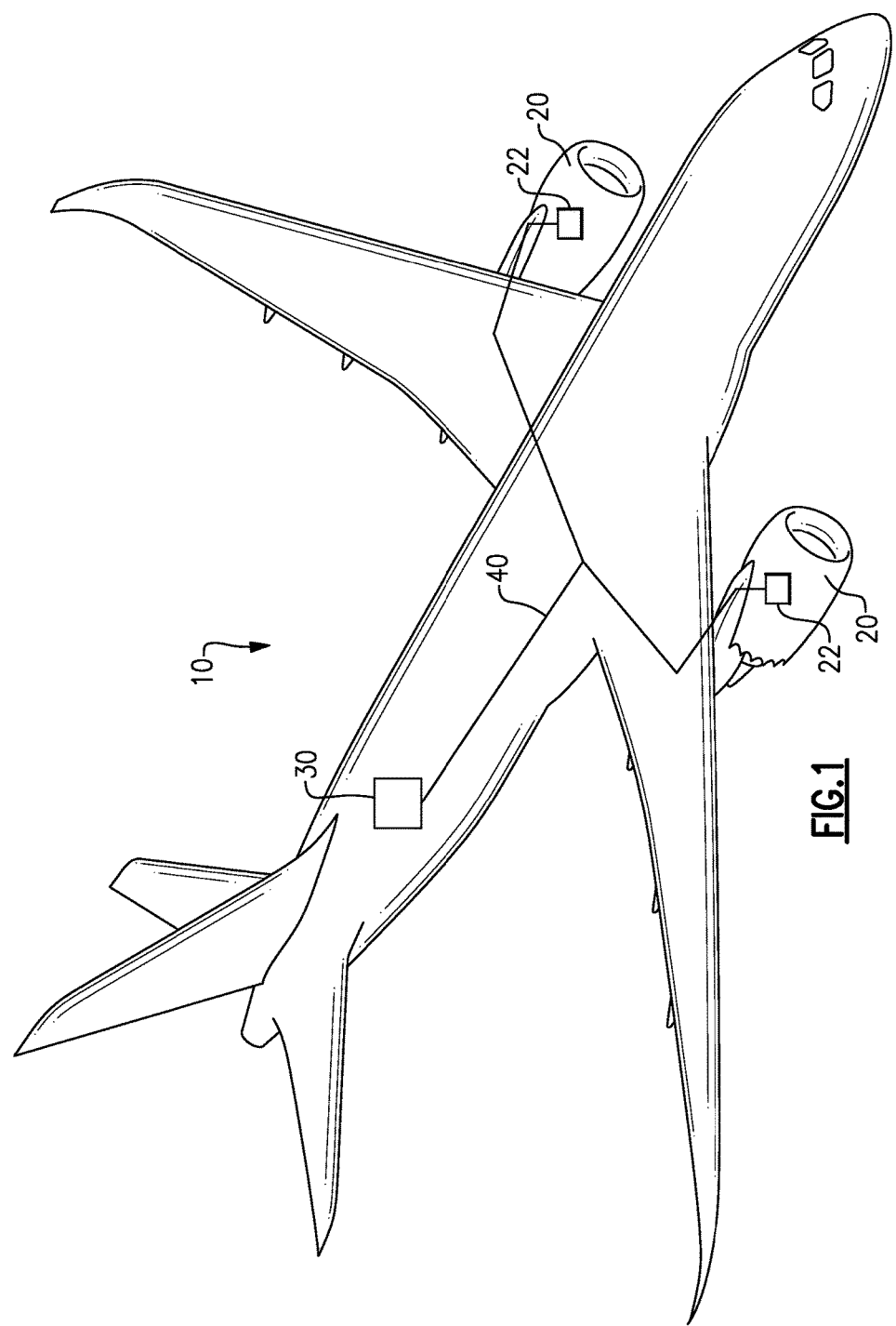
FIG. 1 schematically illustrates an aircraft.

FIG. 1 schematically illustrates an aircraft 10 including multiple gas turbine engines 20. The gas turbine engines 20 can be direct drive gas turbine engines, geared turbofan engines, or any similar gas turbine engine configuration. Also included in the aircraft 10 is an environmental control system 30. The environmental control system 30 is disposed in the lower half of the aircraft 10 and provides cabin pressure, and environmental controls such as temperature control and breathable air to the passenger compartments of the aircraft 10. In alternative examples, the environmental control system 30 can be primarily disposed in an alternate location within the body of the aircraft 10. Furthermore, one of skill in the art, having the benefit of this disclosure, will understand that the illustrated environmental control system 30 can include multiple subsystems, such as air conditioning, cabin pressurization, cabin air pre-cooling, etc. and the multiple subsystems can be disposed generally throughout the aircraft.

The environmental control system 30 is connected to each of the engines 20 via an environmental control system air supply 40. While illustrated in FIG. 1 as a single line connecting each gas turbine engine to the environmental control system 30, one of skill in the art having the benefit of this disclosure will understand that multiple air lines of differing pressures, or multiple redundant air lines of the same pressure, can connect each of the gas turbine engines 20 to the environmental control system 30. Connecting the environmental control system air supply 40 to each of the gas turbine engines 20 is a compressor bleed 22. The compressor bleed 22 represents multiple connections to compressor stages within the gas turbine engine 20. At each of the connections, compressed air is bled (removed from a primary engine flowpath) and provided to the environmental air supply 30.

Existing environmental control systems typically draw high pressure air from a bleed in a high pressure compressor in the gas turbine engine, and low pressure air from a bleed in a low pressure compressor of the gas turbine engine. The high pressure source is used when the engine is at altitude and some low power or idle power is selected, such that the low pressure source does not have enough pressure to provide for passenger comfort. Conversely, the low pressure source is used at altitude, when the low pressure source has sufficient pressure. The low pressure source is, in some examples, still in the high pressure compressor. It is desirable to use the low pressure source for most of the flight because less energy is spent thermodynamically in pressurizing the air at the low pressure source. Also, the temperature at the low pressure source is closer to a temperature required for use in the cabin. As such, less fan air is required to precool this air to the temperature required by the cabin.

Figure 2:
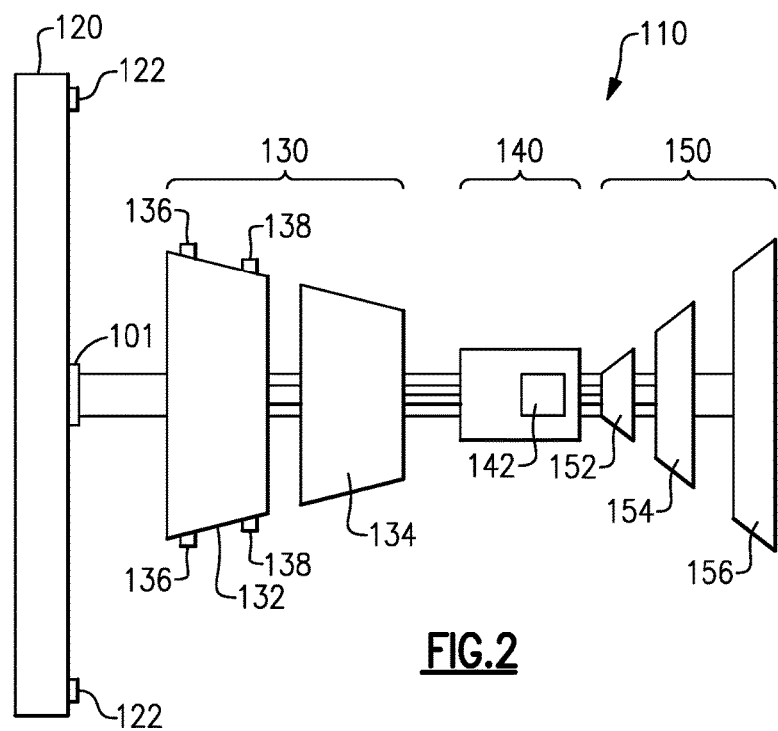
FIG. 2 schematically illustrates a three spool gas turbine engine.

FIG. 2 schematically illustrates an exemplary gas turbine engine 110, including multiple compressor bleeds 136, 138 for providing air to an environmental cooling supply 30 (illustrated in FIG. 1). The exemplary gas turbine engine 110 includes a fan section 120, a compressor section 130, a combustor section 140, and a turbine section 150. The sections 120, 130, 140 150, are arranged sequentially and form a core flowpath through the gas turbine engine 110.

The compressor section 130 includes a first compressor 132 and a second compressor 134. As the compressors 132, 134 are arranged sequentially, the first compressor 132 is at a lower pressure than the second compressor 134. The first compressor 132 is alternatively referred to as a low pressure compressor (LPC) and the second compressor 134 is alternately referred to as a high pressure compressor (HPC).

Compressed air from the compressor section 130 is provided to a combustor 142 in the combustor section 140. The compressed air is mixed with a fuel and ignited in the combustor 142. The gasses created from the combustion are expelled through the turbine section 150. As the gases pass through the turbine section 150, multiple turbines 152, 154, 156 within the turbine section 150 are driven to rotate by the expansion of the combustion gases.

Each of the turbines 152, 154, 156 in the turbine section 150, is connected to one of the compressors 132, 134 in the compressor section 130 or the fan 120 via a shaft. In some examples, such as a geared turbofan engine, the fan 120 is connected to the shaft connected to a corresponding turbine section 152, 154, 156 via a gear structure 101, allowing the fan to rotate at a different speed than the corresponding turbine 152, 154, 156. The gear structure 101 illustrated in FIG. 2 is dashed, indicating that it may not be present in every embodiment of FIG. 1. In a direct drive turbine, the fan 120 is directly connected to the shaft connected to the corresponding turbine 152, 154, 156, and rotates at the same speed as the turbine 152, 154, 156.

In one example engine where there are at least two turbines driving two compressors such as a three spool gas turbine engine, such as the illustrated gas turbine engine, the first turbine 152, positioned aft of the combustor 142 is a high pressure turbine, the second turbine 154 is an intermediate pressure turbine, and the third turbine 156 is a low pressure fan drive turbine.

Within the compressor section 130 are multiple points for compressor bleeds 136, 138. The compressor bleeds 136, 138 remove air from the primary flowpath within the compressor 132, and may provide the bleed air to an environmental control system. In some example engines, the bled air is provided to the environmental control system by way of an intermediate heat exchanger where fan air is used to lower the bleed air temperature before the air is sent on to the rest of the environmental control system. During operation of the gas turbine engine 110, removal of air from the compressors 132, 134 carries with it an efficiency penalty, with a higher pressure of the compressor 132, 134 or stage within a compressor 132, 134 carrying a higher energy loss. In the example gas turbine engine 110, all of the compressor bleeds 136, 138 for providing air to the environmental air supply 40 (illustrated in FIG. 1) are positioned in the low pressure compressor 132. In similar engines including more than two compressor sections, the compressor bleeds 136, 138 for supplying the environmental air supply 40 are all located upstream of the high pressure compressor 134.

In some example gas turbine engines 110, the fan 120 further includes a fan air source 122. The fan air source 122 can provide cool air to a pre-cooler system in the environmental control system. The pre-cooler cools air provided from the compressor section 130 through the compressor bleeds, prior to the air being utilized in the environmental control system 30.

Figure 3:
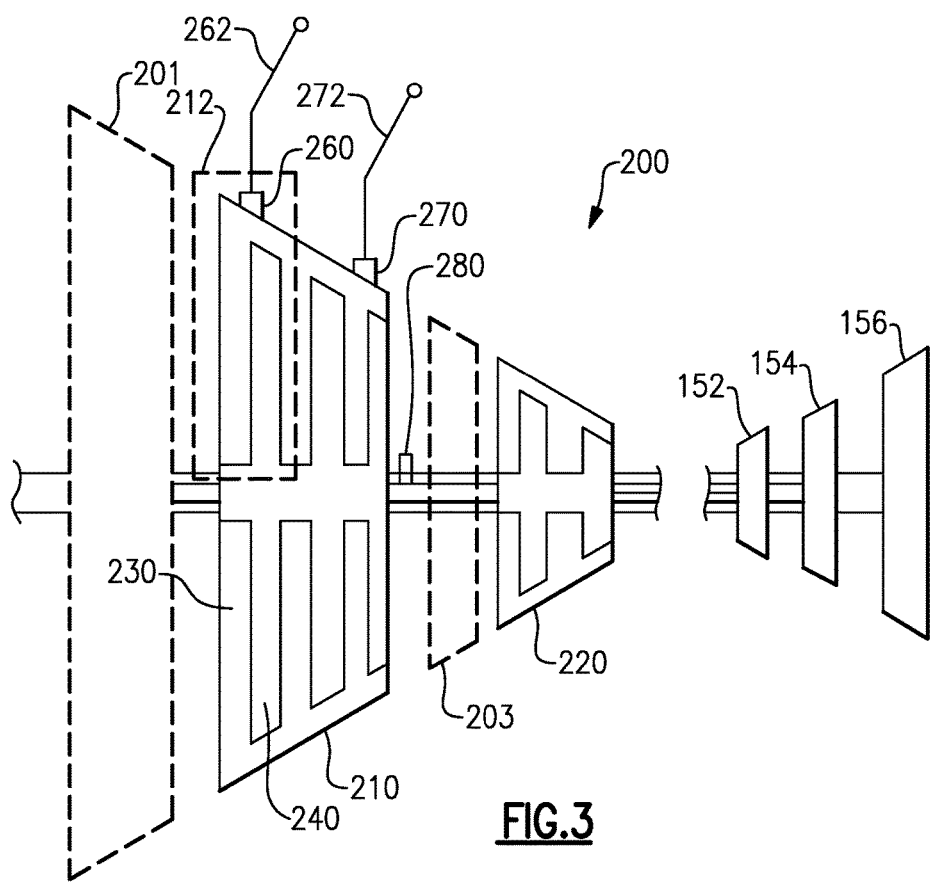
FIG. 3 schematically illustrates a compressor section of a three spool gas turbine engine.

FIG. 3 schematically illustrates a more detailed view of a compressor section 200 for utilization in a gas turbine engine, such as the gas turbine engine 110 illustrated in FIG. 2. As with the compressor section 130, illustrated in FIG. 2, the compressor section 200 includes two compressors 210, 220. Each of the compressors 210, 220 includes multiple rotors 230 and stators 240 that alternate to define compressor stages 212. As will be understood by one of skill in the art, having the benefit of this disclosure, the stages 212 in a compressor 210, 220 are sequentially arranged with the fore most stage in each compressor having the lowest pressure, and the aft most stage in each compressor having the highest pressure.

Multiple compressor bleeds 260, 270 are connected to a corresponding compressor stage, and provide bleed air to an environmental control system air supply 40 (illustrated in FIG. 1) through bleed air pipes 262, 272. While illustrated herein as single connection points, one of skill in the art, having the benefit of this disclosure will understand that each of the compressor bleeds 260, 270 can be multiple bleed points connected circumferentially around the compressor section 200.

Furthermore, in some examples a natural bleed position 280 exists between the high pressure compressor 210 and the low pressure compressor 220. Furthermore, in alternate examples additional compressors 201, 203, or compressor stages can be positioned fore of the low pressure compressor 210, or between the low pressure compressor 210 and the high pressure compressor 220. In the example of FIG. 3, the additional compressor(s) are illustrated via dashed lines indicating that they may not be present in every embodiment of FIG. 3. In these examples, the depicted compressor bleeds 260, 270 can be positioned at the alternative compressor positions. In both the illustrated example, and the alternative examples, however, the high pressure compressor 220 is characterized by a lack of compressor bleeds feeding air to an environmental air supply. That is to say, 100% of the compressor air provided to the environmental control system 30 (illustrated in FIG. 1) of the aircraft is provided from bleed points upstream of the highest pressure compressor 220 of the gas turbine engine.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan;
a compressor section having at least three compressors, and the at least three compressors includes at least two sequential compressors, and;
a combustor section fluidly connected to the compressor section;
a turbine section fluidly connected to the combustor section, the turbine section including at least a first turbine, a second turbine and a third turbine, and wherein a lowest pressure turbine of said first turbine, said second turbine and said third turbine is a fan-drive turbine;
an environmental control system air supply including a plurality of environmental control system air supply bleeds, the plurality of environmental control system air supply bleeds including at least a first compressor bleed and a second compressor bleed, wherein each of said first compressor bleed and said second compressor bleed are positioned upstream of a highest pressure compressor of said at least two sequential compressors; and
a highest pressure compressor of said at least two sequential compressors is a highest pressure compressor of said at least three compressors, is drivably connected to a highest pressure turbine of said at least the first turbine, the second turbine, and the third turbine, a remainder of said at least three compressors are drivably connected to an intermediate pressure turbine of said at least the first turbine, the second turbine and the third turbine, and wherein said fan is drivably connected to the fan-drive turbine.

2. The gas turbine engine of claim 1, wherein the fan includes a fan air source operable to provide fan air to an environmental control system pre-cooler.

3. The gas turbine engine of claim 1, wherein said at least the first compressor bleed and the second compressor bleed comprises a natural bleed disposed between the highest pressure compressor and a compressor upstream of said highest pressure compressor.

4. The gas turbine engine of claim 1, wherein the highest pressure compressor of the at least three compressors is characterized by a lack of environmental control system air supply bleeds.

5. The gas turbine engine of claim 1, wherein the fan is a direct drive fan and is directly connected to said fan-drive turbine via a shaft.

6. The gas turbine engine of claim 1 wherein the fan is a geared fan and is connected via a shaft to said fan-drive turbine.

7. A gas turbine engine comprising:
a fan;
a compressor section having at least three compressors, the at least three compressors including at least two sequential compressors;

a combustor section fluidly connected to the compressor section;

a turbine section fluidly connected to the combustor section, the turbine section including at least three turbines;

an environmental control system air supply including a plurality of environmental control system air supply bleeds, the plurality of environmental control system air supply bleeds including at least a first compressor bleed and a second compressor bleed, wherein each of said first compressor bleed and said second compressor bleed are upstream of a highest pressure compressor of said at least two sequential compressors; and wherein the highest pressure compressor of said at least two sequential compressors is a highest pressure compressor of said at least three compressors, and is drivably connected to a highest pressure turbine of said at least three turbines, a remainder of said at least three compressors are drivably connected to an intermediate pressure turbine of a first turbine, a second turbine and a third turbine of said at least three turbines, and wherein said fan is drivably connected to a lowest pressure turbine of said first turbine, said second turbine and said third turbine.

8. The gas turbine engine of claim 7, wherein the fan includes a fan air source operable to provide fan air to an environmental control system pre-cooler.

9. The gas turbine engine of claim 7, wherein said at least the first compressor bleed and the second compressor bleed comprises a natural bleed disposed between the highest pressure compressor and a compressor upstream of said highest pressure compressor.

10. The gas turbine engine of claim 7, wherein the highest pressure compressor is characterized by a lack of environmental control system air supply bleeds.

* * * * *